(No Model.) 2 Sheets—Sheet 1.
A. HARVEY.
FRICTION CLUTCH.
No. 563,275. Patented July 7, 1896.
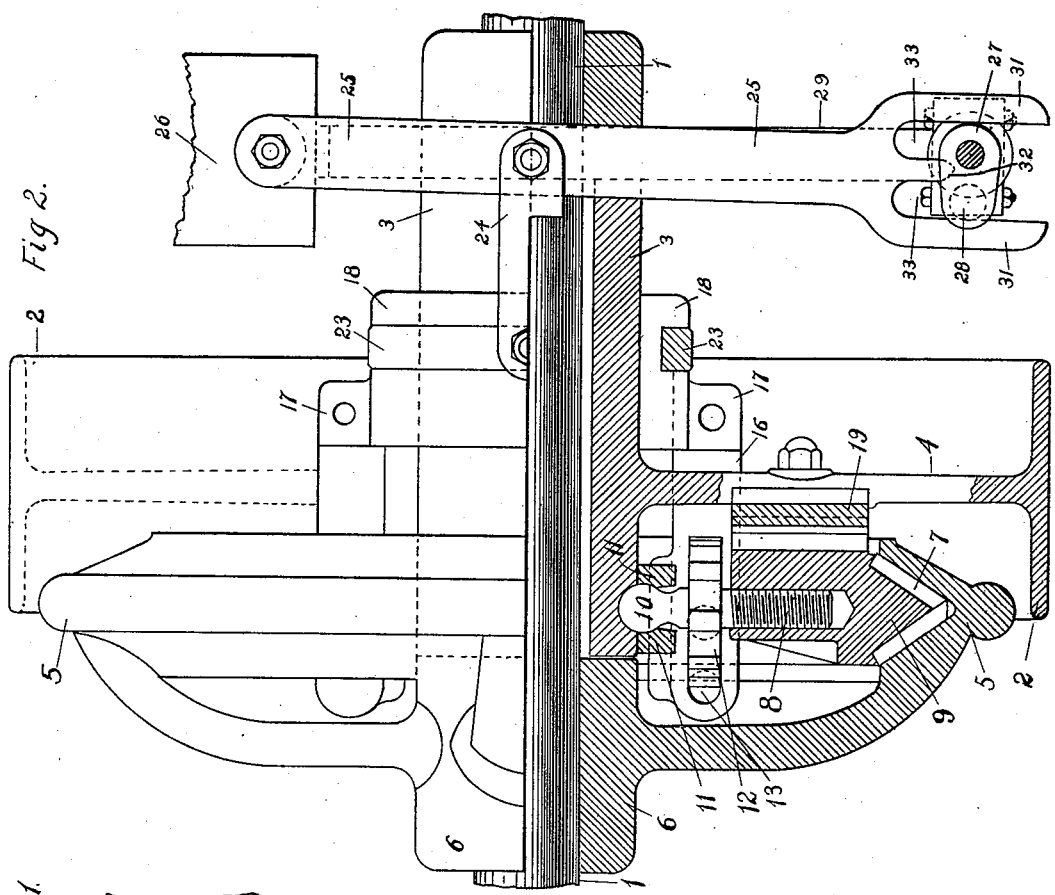
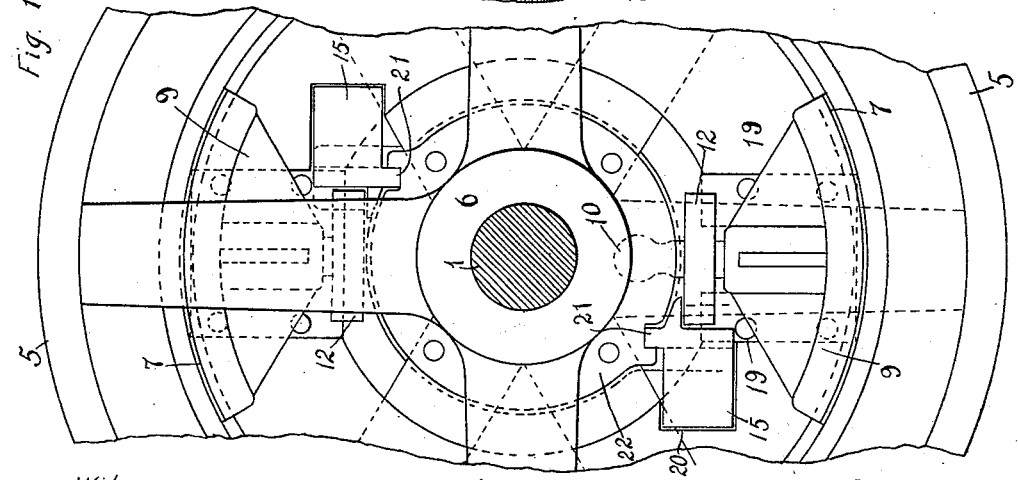
Witnesses.
E. C. Phoenix.
R. Blum
Inventor.
Amasa Harvey.
By P. H. Gunckel
His Attorney.

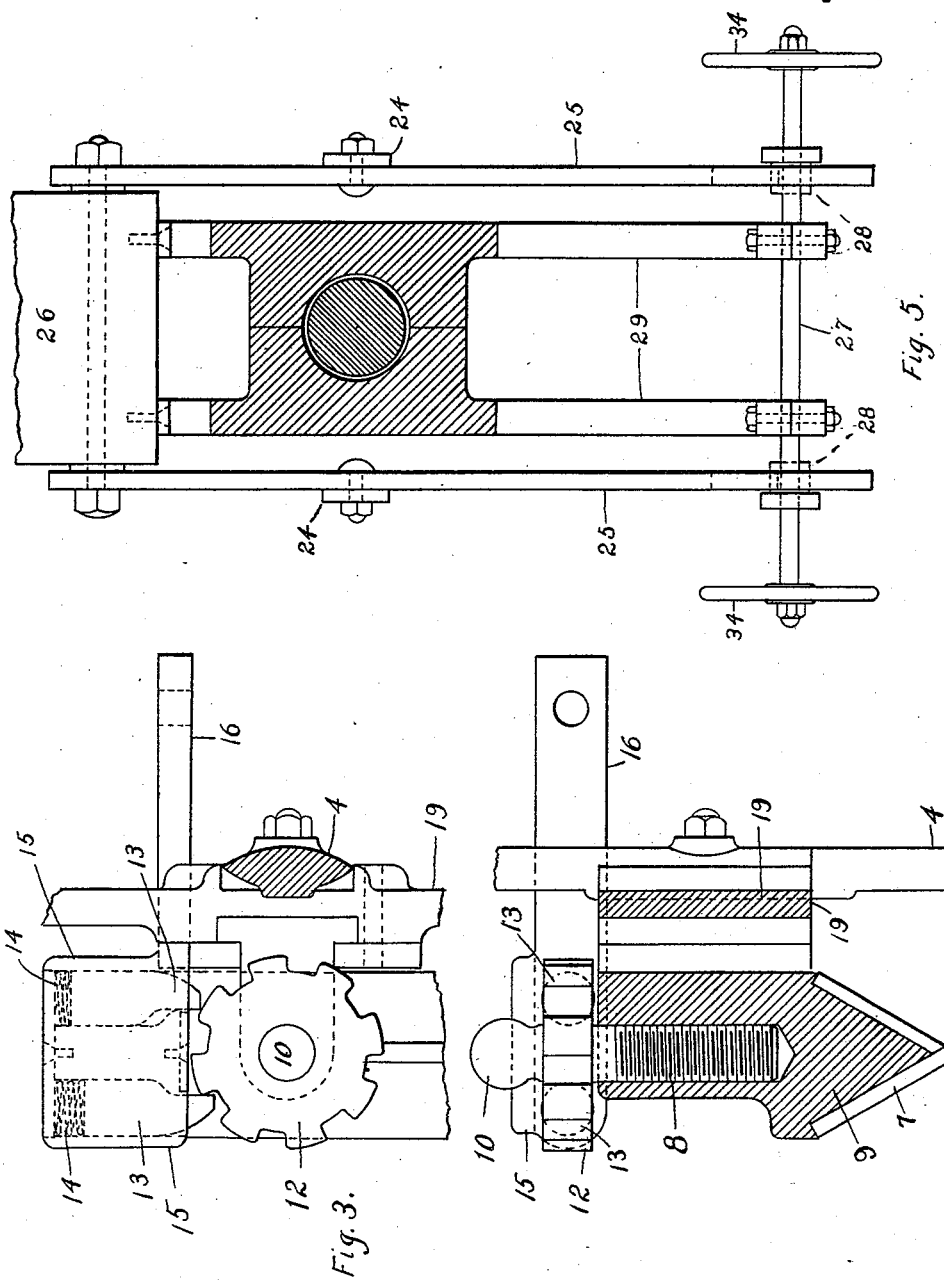

UNITED STATES PATENT OFFICE.

AMASA HARVEY, OF MINNEAPOLIS, MINNESOTA.

FRICTION-CLUTCH.

SPECIFICATION forming part of Letters Patent No. 563,275, dated July 7, 1896.

Application filed January 27, 1896. Serial No. 576,924. (No model.)

*To all whom it may concern:*

Be it known that I, AMASA HARVEY, a citizen of the United States, residing in the city of Minneapolis, county of Hennepin, and State of Minnesota, have invented a certain new and useful Improvement in Friction-Clutches, of which the following is a specification.

My invention relates to the class of friction-clutches in which the clutch-shoes, or equivalent frictional devices, are moved radially to and from contact with the inner surface of the rim of a revolving wheel for operating at will a pulley or wheel loosely mounted on the axis of the rotary member, and I have adopted, for purposes of illustration, a construction of frictional devices resembling those set forth in my Patent No. 520,109, of May 22, 1894; but I do not wish to confine my protection in the present improvements to that form, or any particular form or arrangement of frictional clutching devices.

The object of my present improvements is principally to enable an adjustment of the shoes while the mechanism is in operation, as well as when it is stationary; also to avoid the necessity of counterbalancing the friction device to prevent frictional contact by centrifugal force when not desired, and also to provide a novel, desirable, and simple mechanism for operating the shifter to throw out or retract the friction-shoes.

The more important improvements, stated in a general way, consist in providing a screw-threaded member for engaging and moving the shoe-carriers outward or inward, a ratchet-and-pawl device for turning such member, and a novel lever mechanism for sliding the shifter to operate and control such ratchet-and-pawl device, all of which will be hereinafter fully set forth, and particularly pointed out in the claims.

In the drawings accompanying this specification, Figure 1 is an elevation, in line with the driving-shaft, of the improved friction-clutch in place, portions of the sides being broken away. Fig. 2 is a side elevation of the same mechanism, showing the lower half in central vertical section. Fig. 3 is a plan view, partly sectional, of the ratchet-and-pawl device for operating the shoe-carrier. Fig. 4 is an elevation, partly sectional, of the device of Fig. 3; and 5 is an elevation, viewed in line with the shaft, of the lever mechanism for actuating the shifter-collar.

In the drawings referred to, 1 designates the driving-shaft; 2, a pulley, the hub 3 of which is loose on the shaft, and having spokes 4 connecting the rim and hub. 5 is a friction-wheel having its hub 6 attached to the shaft, so as to rotate with it, and 7 is a shoe designed to be moved laterally to and from frictional contact with the wheel 5, and suitably and controllably connected, so as to cause the pulley to revolve or remain stationary, as may be desired. All of these parts may be of any usual or desirable construction.

It will be understood, of course, that in this, as in most frictional clutches, the friction-wheel revolves whenever the shaft is rotated, and that the pulley or like member that is to be rotated only at will is put into operative connection when the friction device is thrown into contact with the wheel, and usually by means of a shifter-sleeve that is loose on the driving-shaft.

In place of the toggle-levers or equivalent devices with which I am familiar, heretofore used for controlling the frictional contact of the shoe, I provide in the present instance a rod or bolt 8, having a screw-threaded portion engaging a correspondingly-threaded socket in the shoe-carrier 9, and a round head 10 in a suitable circular socket, partly in the pulley-hub and partly in a ring or flange 11 thereon, whereby the bolt is rendered capable of being turned in either direction without moving radially toward or from the shaft, but with the effect of moving the shoe-carrier inward or outward in radial direction. This bolt constitutes the axis of a ratchet-wheel 12, to which it is permanently fixed. For engaging the teeth of the ratchet-wheel there are provided two pawls 13, arranged to be held to contact by springs 14, operatively connected to them in any suitable way, and adapted to hold them in contact with the ratchet, as service may require, and these are retained in a box or housing 15, carried on the end of a bar 16, arranged to slide through and be guided by a slot in the pulley-arm 4. One of the pawls is arranged to engage and move the ratchet-wheel in one direction, and the other in opposite direction, as indicated in the drawings, depending upon the direction of movement at the bar 16. This bar is attached to a lug 17 on the shifter-sleeve 18, which is arranged to slide on the pulley-hub 3; and so it will be seen that when the shifter-sleeve 18 is moved in one direction it may be made to serve to operate the ratchet to make frictional contact of the shoe with the wheel, and when moved in opposite direction to release the contact. The shoe-carriers 9 are connected to and guided by the spokes of the pulley by plates 19 or other suitable means for making connection and permitting the shoes to be moved radially to and from the contact with the wheel, and the housing-boxes 15 for the pawls are prevented from lateral movement by their operation in slots 20 and 21 in the side plates 19 and 22 of the wheel.

As a means of sliding the shifter-sleeve 18 there is provided on it a loose ring 23, which remains stationary when the sleeve is rotated. To this ring there is connected at each side of the shaft a bar 24, the outer end of which is connected to a lever 25. The upper end of each lever is pivoted to a suitable stationary support 26, and to the lower ends of the levers are connected the devices for operating them to slide the shifter-sleeve. The means for operating these levers consists of a shaft 27, having cranks 28 for engaging them to cause movement toward or away from the pulley. The shaft 27 is journaled in hangers 29, depending from the support 26, or the support may be a sleeve that is loose on the shaft 1, so that it will not turn with the rotation of the shaft. The portion of each of these levers that is engaged by the crank is composed of forks 31 and an intermediate tongue; and the object of this construction is that when the crank-shaft is turned in one direction the crank will operate only in one of the slots of the lever—between the tongue and the fork at one side—and when turned in opposite direction it will work in the opposite slot. That is, for illustration, if the crank be turned toward the right when in the position shown in Fig. 2 it will operate continuously in the left-hand slot; but that if it be turned toward the left its operation will be confined to the right-hand slot. The effect of this operation is that the adjustment of the friction-shoes to the wheel may be regulated to a nicety when the cranks are turned in one direction; and the extent of their movement from contact may be controlled with equal nicety and certainty when the cranks are operated in opposite directions. In the position of parts illustrated by Fig. 2 the shoes are in as tight frictional contact as is possible, and to decrease the contact pressure it would be necessary only to move the crank 28 to a slight extent upward or downward. Any convenient means may be used for operating the shaft 27 at will, as, for instance, hand-wheels 34, fixed to its protruding ends.

The operation of the mechanism, which is probably obvious from the foregoing description, is as follows: The friction-wheel being in rotation whenever the driving-shaft is turned, and the pulley being loose on the shaft, and the shifter being loose and capable of being made to slide in line with the shaft, when it is desired to revolve the pulley one of the hand-wheels 34 may be manipulated to turn the cranks of the shaft 27 and throw the levers 25 toward the pulley and preferably to a point near the position shown in Fig. 2. This movement carries the shifter, and with it the pawl devices for operating the ratchet, and consequently forces the shoe-carrier outward by the screw movement of the bolt 8; and upon the establishment of proper frictional contact the pulley will be carried with the friction-wheel because of the connection of the devices to it; and when it is desired to release the frictional contact it is only necessary to turn one of the hand-wheels in opposite direction, when the opposite effect upon the parts will be produced, thus releasing the devices; and not only can the frictional devices be thus thrown to engagement at will, but the degree of friction or pressure can be regulated while the devices are in operation; and, furthermore, all necessity for counterbalancing-weights or other means for preventing frictional contact by centrifugal force when not desired is avoided. I have illustrated and described only a single style of friction-clutch, but it will be obvious to one familiar with such devices that the substance of my improvements can be readily adapted by the skilled mechanic to forms of clutches differing in many particulars from the one I have shown and described.

Having described my invention, what I claim is—

1. In a friction-clutch, the combination with a sliding shifter, of a lever having a link connection with the shifter and having one end pivoted and the other provided with slots and an intermediate tongue, a crank-shaft arranged to operate in such slots, and suitable means for supporting and operating such shaft, substantially as set forth.

2. In a friction-clutch, the combination with the shifter and a suitable lever-support, of a lever having at its free end two slots separated by an intervening tongue, and a shaft having a crank arranged to operate in such slots, in the manner set forth.

3. In a friction-clutch, the combination with a shoe-carrier and a screw for operating it, a ratchet-and-pawl device arranged to be operated to turn the screw by the movement of a shifter, of a lever for operating the shifter having one end pivoted and the other provided with slots and an intermediate tongue, and a crank-shaft arranged to operate in such slots, substantially as set forth.

4. In a friction-clutch, the combination with a driving member and a member to be driven, of a friction-shoe and its carrier, a screw-threaded device engaging the shoe-carrier to adjust it and having a head swiveled to permit it to be turned but prevent it from moving radially from the shaft, a ratchet carried by said screw device, a pawl device carried by the member to be driven and connected to the shifter, and a suitable lever and connections for operating the shifter to turn the screw and control the position of the shoe, substantially as set forth.

5. In a friction-clutch, a driving member and a member to be driven, a radially-movable shoe-carrier having guides provided for its movement by the member to be driven, a screw device engaging the shoe-carrier for moving it radially, a swiveled head on said screw device permitting the screw to be turned but preventing movement radially to the shaft, a ratchet carried by the screw device, pawls and a carrier for them, a bar connected to the shifter for supporting the pawl-carrier, guides for such bar, and lever devices for operating the shifter, for the purpose set forth.

In testimony whereof I have hereunto set my hand this 21st day of January, 1896.

AMASA HARVEY.

In presence of—
  R. BLUME,
  P. H. GUNCKEL.